(12) United States Patent
Boyd et al.

(10) Patent No.: US 10,871,229 B2
(45) Date of Patent: *Dec. 22, 2020

(54) ELASTOMERIC GEL BODY GASKET HAVING A SUBSTANTIALLY INCOMPRESSIBLE SKELETON, A METHOD OF MAKING AND USING THE SAME

(71) Applicant: THE PATENT WELL LLC, Fort Worth, TX (US)

(72) Inventors: Matt Boyd, Fort Worth, TX (US); Jeff Busby, Millsap, TX (US); Kent Boomer, Aledo, TX (US); Michael Dry, Fort Worth, TX (US)

(73) Assignee: The Patent Well LLC, Fort Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/223,912

(22) Filed: Dec. 18, 2018

(65) Prior Publication Data

US 2019/0120384 A1    Apr. 25, 2019

Related U.S. Application Data

(63) Continuation of application No. 14/937,224, filed on Nov. 10, 2015, now Pat. No. 10,190,688, which is a
(Continued)

(51) Int. Cl.
*B64F 5/10* (2017.01)
*F16J 15/10* (2006.01)
(Continued)

(52) U.S. Cl.
CPC ............... *F16J 15/104* (2013.01); *B32B 3/26* (2013.01); *B32B 37/156* (2013.01); *B64C 1/14* (2013.01);
(Continued)

(58) Field of Classification Search
CPC .. B64C 1/18; B64C 1/36; B64C 1/1464; F16J 15/14; F16J 15/22
See application file for complete search history.

(56) References Cited

U.S. PATENT DOCUMENTS

| 4,152,479 A | 5/1979 | Larsen |
| 6,530,577 B1 | 3/2003 | Busby |

(Continued)

FOREIGN PATENT DOCUMENTS

| EP | 2685137 | 1/2014 |
| WO | 9525916 | 9/1995 |

(Continued)

OTHER PUBLICATIONS

Conwed Global Netting Solutions, Conwed Plastic netting 101, www.conwedplastics.com/en/about/plastic-netting-101, 6 pages Aug. 23, 2013.

(Continued)

*Primary Examiner* — Richard G Davis (57) ABSTRACT

Gaskets, including aircraft gaskets, are disclosed, the gaskets having an elastomeric gel body and substantially incompressible skeletons. The bodies may be pliable and deformable and, in one example, may be comprised of a two-part chemically cured polyurethane that sets up as a gel after mixing with the web so that it is fully integral with the web and so that there is substantially no air bubbles or air pockets left in the web. The web may be a regular shaped web and made of nylon.

20 Claims, 11 Drawing Sheets

Related U.S. Application Data continuation-in-part of application No. 14/484,570, filed on Sep. 12, 2014, now Pat. No. 10,150,555.

(60) Provisional application No. 62/078,158, filed on Nov. 11, 2014, provisional application No. 62/120,504, filed on Feb. 25, 2015, provisional application No. 61/876,849, filed on Sep. 12, 2013.

(51) Int. Cl.
| | |
|---|---|
| *B32B 3/26* | (2006.01) |
| *B32B 37/00* | (2006.01) |
| *B64C 1/14* | (2006.01) |
| *B64F 5/50* | (2017.01) |
| *B64C 1/18* | (2006.01) |
| *B64D 37/00* | (2006.01) |

(52) U.S. Cl.
CPC .................. *B64F 5/10* (2017.01); *B64F 5/50* (2017.01); *F16J 15/102* (2013.01); *B32B 2305/022* (2013.01); *B32B 2605/18* (2013.01); *B64C 1/1446* (2013.01); *B64C 1/18* (2013.01); *B64D 37/00* (2013.01)

(56) References Cited

U.S. PATENT DOCUMENTS

| | | | |
|---|---|---|---|
| 6,695,320 | B2 | 2/2004 | Busby |
| 7,229,516 | B2 | 6/2007 | Busby |
| 7,520,097 | B2 | 4/2009 | Aalbers et al. |
| 7,862,049 | B2 | 1/2011 | Olson |
| 8,561,310 | B2 | 10/2013 | Rife |
| 8,633,402 | B2 | 1/2014 | Bunyan et al. |
| 8,652,362 | B2 | 2/2014 | Zhamu et al. |
| 8,691,033 | B1 | 4/2014 | Busby et al. |
| 8,759,692 | B2 | 6/2014 | Bunyan et al. |
| 8,766,108 | B2 | 7/2014 | Bunyan et al. |
| 9,751,244 | B2 | 9/2017 | Dry |
| 2002/0063397 | A1 | 5/2002 | Gaines et al. |
| 2003/0234498 | A1 | 12/2003 | Busby et al. |
| 2004/0041356 | A1* | 3/2004 | Smith ............... B32B 27/04 277/651 |
| 2004/0070156 | A1* | 4/2004 | Smith ............... B32B 27/04 277/651 |
| 2008/0280040 | A1* | 11/2008 | Barrall ............ F16J 15/104 427/256 |
| 2010/0253012 | A1 | 10/2010 | Zhuang et al. |
| 2013/0168612 | A1 | 7/2013 | Nguyen |
| 2013/0273342 | A1 | 10/2013 | Johnson et al. |
| 2014/0015204 | A1 | 1/2014 | Boyd et al. |
| 2014/0334868 | A1 | 11/2014 | Apfel |
| 2015/0252903 | A1 | 9/2015 | Boyd et al. |

FOREIGN PATENT DOCUMENTS

| | | |
|---|---|---|
| WO | 2010135249 | 11/2010 |
| WO | 2015168118 | 11/2015 |

OTHER PUBLICATIONS

Conwed Global Netting Solutions, Conwed Netting Characteristics, www.conwedplastics.com/en/about/plastic-netting-101/netting-characteristics, 8 pages Aug. 23, 2013.

Conwed Global Netting Solutions, How Is Conwed Plastic Netting Made?, www.conwedplastics.com/en/about/plastic-netting-101/netting-process, 5 pages Aug. 23, 2013.

Conwed Global Netting Solutions, Extruded Square Netting, 222.conwedplastics.com/en/core-products/extruded-netting/square, 5 pages Aug. 23, 2013.

Conwed Global Netting Solutions, Resins and Additives, www.conwedplastics.com/en/core-proucts/resins-additives, 7 pages Aug. 27, 2013.

Supplementary European Search Report, Application No. EP 14843364, 5 pages dated May 3, 2017.

U.S. Appl. No. 14/484,570, filed Sep. 12, 2014 Sep. 9, 2014.

\* cited by examiner

ELASTOMERIC GEL BODY GASKET HAVING A SUBSTANTIALLY INCOMPRESSIBLE SKELETON, A METHOD OF MAKING AND USING THE SAME

RELATED APPLICATIONS

This continuation patent application claims the benefit of, priority to, and incorporates by reference U.S. application Ser. No. 14/937,224, filed Nov. 10, 2015; 61/876,849 filed Sep. 12, 2013; 62/078,158 filed Nov. 11, 2014; and 62/120,504 filed Feb. 25, 2015. It also incorporates by reference U.S. patent application Ser. No. 14/484,570, filed Sep. 12, 2014.

FIELD OF THE INVENTION

Gaskets and gasket tape, including aircraft gaskets and gasket tape having elastomeric gel bodies and a substantially incompressible skeletons.

BACKGROUND OF THE INVENTION

Gaskets, including aircraft gaskets, are typically formulated for a specific set of criteria. While most gaskets have an environmental sealing function, the nature and extent of the sealing may be different in different applications. That is to say, gaskets, including aircraft gaskets, tend to be environment and assembly specific. What may be used as a gasket for interposition between an engine head and an engine block for an internal combustion engine would typically not be the same as the gasket for a gas meter, an air conditioner, or the speaker of a sound system, for example.

In some cases, it is typically desirable that a gasket be made from a material that, to some degree, yields under compression and provides a good environmental seal. A number of Applicant's products are directed to use in the field of aviation, more specifically, for use on aircraft bodies. These include the disclosures and specifications set forth in US Patent Publication Nos. 2004/0070156 and 2004/0041356, and U.S. Pat. Nos. 6,530,577; 6,695,320; and 7,229,516, all of which are incorporated herein by reference.

Gaskets are typically provided for use under compression for sealing between two pieces of an aircraft. These pieces may include a moveable workpiece, such as an aircraft antenna, and an aircraft fuselage, the combination having a gasket at least partially therebetween with the gasket under compression between the antenna and the aircraft fuselage. An aircraft fuel access door may also be provided with a gasket under compression between the fuel access panel or door and a retainer assembly for the fuel access panel adapted to retain the fuel access panel against the fuselage of the aircraft. In another embodiment of Applicant's aircraft gaskets, aircraft floor panels are fastened under compression against stringers or floor mounting members with a gasket or gasket tape between the floor panels and the stringers. In most of these uses, compression is provided by suitably dimensioned fasteners, such as bolts and receiving nuts.

SUMMARY OF THE INVENTION

Applicant has discovered for certain applications that may desire reusability of the gasket and/or torque retention, a novel gasket with, in certain embodiments, a flexible (in two dimensions), but substantially incompressible (in thickness), non-knitted skeletal member for interposition at or between a top and bottom layer of a body of a generally tabular gasket shape. In some embodiments, Applicant has found that a combination of a novel skeletal member with a tacky gel body may provide for excellent compression set resistance and torque retention.

By compression set resistance, Applicant means that the gasket resists setting under compression, such that when compression is released, the gasket will rebound to approximately (or at least toward) its original thickness. For torque retention, Applicant refers to applying torque to fasteners between a workpiece and a base or body to which the workpiece attaches, which torque remains substantially unchanged (typically) even as time passes. This ability to retain settings in a non-metallic gasket close (about 60-90% of original value after about 20-45 min.) to the initial torque setting between a workpiece and a body or base with the gasket under compression saves the installer of the workpiece time.

A gasket or gasket tape is provided for interposition between a moveable aircraft workpiece and a stationary platform, the gasket comprising a pliable, elastomeric gel body having an upper surface, a lower surface, and a perimeter. A non-metallic, non-fibrous, electrically non-conductive, non-woven skeletal web is provided having an upper surface, a lower surface, a perimeter and a multiplicity of strands meeting at and integral with a multiplicity of joints, the strands and joints defining a multiplicity of open pores. The elastomeric gel body is typically the same size or thicker than and substantially encapsulates the skeletal web, including filling the pores thereof, and is integral therewith. The x and y dimensions of the skeletal web are typically much greater than the z (thickness) dimension. In one embodiment, there is only a single layer of skeletal web and gel between the upper and lower surfaces of the elastomeric gel body. The gasket is configured for lateral gel flow under compression between the workpiece and base, such compression in the range of about 50-500 psi, wherein such compression in some embodiments may cause contact with the skeletal web in the psi ranges indicated. For the gaskets tested, the pressure fails to cause substantial permanent deformation of the skeletal web. The yield limit was not reached.

The gasket or gasket tape typically has similar perimeters in size and shape to that of the workpiece. The surface of the gel body is tacky and may have hardness about 40-150 on 37.5 gr. half cone penetrometer. The skeletal web resists compression and exhibits structural and dimensional stability following compression of the gel body at the defined psi range. The skeletal web, in one example, is comprised of nylon. The non-woven skeletal web is typically about 40-60% open pore area. The thickness of the elastomer gel body may be between about 0.020 inches and 0.250 inches and the thickness of the skeletal web may be between about 0.010 inches and 0.125 inches.

The multiplicity of strands in the skeletal web include some strands in a machine direction and other strands in a cross direction, and the strands in the machine direction may be thicker than the strands in the cross direction. The joints may be thicker than any of the multiplicity of strands. The skeletal web may have a tensile strength of between about 10 MPa and 150 MPa. The joint may be square or rectangular in cross section or the joint may be substantially circular in cross section. The compression of the skeletal web is less than about five percent and, in some cases, the compression of the skeletal web is less than one percent. In one embodiment, the compression on the web fails to cause the skeletal web to exceed its elastic limit.

An assembly for use with an aircraft is provided, the assembly comprising an aircraft base, a workpiece for removably engaging the base; and a gasket or gasket tape for interposition between a moveable aircraft workpiece and a stationary platform. The gasket may comprise a pliable, elastomeric gel body having an upper surface, a lower surface, and a perimeter; and a non-metallic, non-fibrous, non-conductive, non-woven skeletal web having an upper surface, a lower surface, a perimeter and a multiplicity of strands meeting at and integral with a multiplicity of joints, the strands and joints defining a multiplicity of open pores. The elastomeric gel body may be the same size or thicker than and substantially encapsulates the skeletal web, including filling the pores thereof, and is integral therewith. The x and y dimensions of the gasket are typically much greater than the z (thickness) dimension. In one example, there is only a single layer of skeletal web and gel between the upper and lower surfaces of the elastomeric gel body and wherein the gasket is configured for lateral gel flow under compression between the workpiece and base, such compression in the range of about 50-500 psi, such compression fails to cause substantial permanent deformation of the web. The workpiece, in one example, is a fuel access door panel. The workpiece, in another, is an aircraft antenna. The workpiece, in another example, is an aircraft floor panel. The body and skeletal web have the same or similar properties as set forth in the foregoing paragraphs. The assemblies may further include a fillet seal at the edges.

A gasket or gasket tape for interposition between a removeable aircraft workpiece and a stationary platform, the gasket comprising a pliable, elastomeric gel body having an upper surface, a lower surface, and a perimeter; and a non-metallic, non-fibrous, electrically non-conductive, non-woven skeletal web having an upper surface, a lower surface, a perimeter, and a multiplicity of strands meeting at and integral with a multiplicity of joints, the strands and joints defining a multiplicity of open pores. The elastomeric gel body is at least the same size as and substantially encapsulates the skeletal web, including filling the pores thereof, and is integral therewith. The x and y dimensions are much greater than the z (thickness) dimension; and there may be only a single layer of skeletal web and gel between the upper and lower surfaces of the elastomeric gel body. The gasket may be configured for lateral gel flow under compression in the range of about 50-500 psi, such compression fails to cause substantial compression of the web.

A gasket or gasket tape for interposition between a removeable aircraft workpiece and a stationary platform, the gasket comprising a pliable, elastomeric polyurethane gel body having an upper surface, a lower surface, and a perimeter; and a non-metallic, non-fibrous, electrically non-conductive, non-woven skeletal web having an upper surface, a lower surface, a perimeter, and a multiplicity of strands meeting at and integral with a multiplicity of joints. The strands and joints may define a multiplicity of open pores. The elastomeric gel body is typically at least the same size as and substantially encapsulates the skeletal web, including filling the pores thereof, and is integral therewith. The x and y dimensions are usually much greater than the z (thickness) dimension. There may be only a single layer of skeletal web and gel between the upper and lower surfaces of the elastomeric gel body. The gasket is configured for lateral gel flow under compression in the range of about 50-500 psi, such compression fails to cause the skeletal web to exceed its elastic limit.

DETAILED DESCRIPTION OF THE ILLUSTRATED EMBODIMENTS

The various gaskets and tape of the instant disclosure may be used for numerous applications on an aircraft and, in some embodiments, a railroad car, a ship or other waterborne vessels. The aircraft uses include, but are not limited to: fuel access door gaskets, aircraft floor panel gaskets, and aircraft antenna gaskets.

This specification relates to a gasket 10 or a gasket tape 26, both comprising a body 12 and a web skeleton 14 as seen in FIGS. 1, 1A, 2, 3A, 3B, and 3C. Body 12 is typically sheet-like, typically x and y>>z, and web skeleton 14 is typically bendable along its x, y axes, substantially incompressible along a Z axis, non-fibrous, non-conductive, and non-woven. Body 12 may have a tacky top surface 16 and a spaced apart, tacky bottom surface 18. Gasket 10 may include outer perimeter or walls 20 and inner perimeter or walls 22 defining a generally sheet-like composite, which may include fastener holes 24. In one embodiment, skin 30 may be interposed on one or both sides of the body, which skin 30 may be intended to be part of the gasket, that is to say, is intended to be under compression between a platform and a workpiece. A release film 28 may be provided for adherence to the top 16 and/or bottom 18 surfaces, which release film prevents the tacky surfaces from inadvertently adhering to objects prior to removal. Release film 28 is intended for removal prior to use between a workpiece and a platform, that is to say, for interposing the gasket between mating surfaces.

Web Skeleton

Applicant's web skeleton 14 may be non-woven (non-knitted), non-electrically conductive, non-fibrous, and substantially incompressible in the typical PSI and torque ranges set forth herein. Applicant provides for a gasket with excellent sealing characteristics and compression set resistance and torque retention properties, which may be substantially resistant to plastic deformation and resulting compression set. In particular embodiments, Applicant provides a web skeleton with multiple open pores defined by monofilament strands 34 joined at integral joints 36. In certain embodiments, Applicant's skeletal carrier is a web skeleton with voids or open pore space in the range of about 20 to 80% of preferably about 40-60% of the web area (top view) and is flexible, but non-crushable in the PSI and torque ranges set forth herein, and, in many embodiments, substantially non-stretchable in the x, y plane. In some embodiments, the gasket or tape edges may comprise open voids.

Applicant's carrier or web skeleton 14 be comprised of multiple linear strands 34, which join at joints 36. The joints and strands may define at non-edge portions of gasket 10 enclosed pores 38, which may be square, rectangular, diamond shaped or other suitable shape. Strands 34 may be in cross-section round, rectangular, square or any other suitable shape (see FIGS. 3A-3C). Strands 34 may be thinner, in some embodiments, at non-joint regions, such as midpoint between the joints (see FIG. 3D).

Strands may be non-metallic and made by an extrusion process, such as that used by Conwed Plastics (www.conwedplastics.com), which discloses a known method of manufacturing non-knitted plastic netting, which results in a non-knitted netting, and which may use different resins including, in one embodiment, an aliphatic polyamide (for example, nylon), and formulations with varying properties as a raw material. In certain embodiments, Conwed extruded netting is used, which in some embodiments is manufactured through a single step continuous extrusion process that yields a plastic material with integral joints.

This is a melt processing of thermoplastics into netting. An extruder melts and pressurizes plastic pellets and forces them through a tooling and a die to create a netting profile. After the plastic moves through the die and is cooled, the plastic hardens into a predetermined shape. These may be square, diamond. and flat netting. Among the methods of manufacturing the webbing are any of the methods of manufacturing set forth in Conwed, U.S. Pat. No. 4,152,479, incorporated herein by reference. Extruded webbing, such as Conwed extruded webbing, may be oriented after extrusion to provide a machine direction and a cross (transverse) direction to the strands of the netting.

Mesh size is the distance of the center of one strand to the center of the next strand in that direction. Hole size is the distance from the strand's inner edge to the next strand's inner edge in that direction. Both measurements are typically reported in inches, millimeters, centimeters, and may be specified for both machine and cross (transverse) directions. Strand count is the number of strands observed in a given length in that direction, and is typically reported in "strands per inch." In one embodiment of Applicant's gasket or gasket tape, the web skeleton has a strand count of about 16 per 1" in both MD and CD.

Netting thickness can also be referred to as height, the thickness may be provided in some embodiments with joints that are thicker than the strands and, in other embodiments, where joints are about the same thickness as the strands. An integral joint means that strands where they meet at the joint are not separate or separable, and are typically not identifiable as individual strands at the joint. This is in contradistinction to a woven fabric or knitted skeletal member, such as some of those disclosed in the Applicant's publications and patents as incorporated herein by reference.

At about 200 psi or in the typical PSI range set forth herein, the elastic limit (or at least the yield point) of the plastic or nylon that, in certain embodiments, comprises the composition of the web skeleton in a direction perpendicular to the plane of the net is not achieved. These ranges are provided for the web skeleton in the gasket. Those compression ranges are as follows. In one embodiment, the compression range is between about 150-300 psi and, in another embodiment, about 50-500 psi and, in another embodiment, up to about 800 psi. At these ranges, torque values for fasteners x, y may be between about 10 in. lbs. about 100 in. lbs. (depending on area, and number and size of fasteners) on, for example, aircraft antenna gaskets.

A re-torque (on slightly curved fixtures) test was performed and the results for the identified gaskets specifications are as follows:

| Antenna | Polyurethane | Carrier | Thickness (inches) Entire Gasket (Skeletal) | Undercut (inches) | Washers | Torque (in lbs) | Time (hours) | Breakaway Torque (in lbs) |
|---|---|---|---|---|---|---|---|---|
| GPS | AVDEC PLUM | Woven fiberglass | 0.045 (.013) | 0 | No | 35 | 24 | 6.5 |
| GPS | AVDEC PLUM | Conwed non-woven Nylon | 0.035 (.028) | 0 | No | 35 | 24 | 23 |
| GPS | AVDEC PLUM | Conwed non-woven Nylon | 0.045 (.028) | 0 | No | 35 | 24 | 10.5 |
| Radio Altimeter | AVDEC PLUM | Woven fiberglass | 0.045 (.013) | 0 | No | 35 | 24 | 10 |
| Radio Altimeter | AVDEC PLUM | Conwed non-woven Nylon | 0.035 (.028) | 0 | No | 35 | 24 | 24.5 |
| Radio Altimeter | AVDEC PLUM | Conwed non-woven Nylon | 0.045 (.028) | 0 | No | 35 | 24 | 15.5 |

As can be seen, embodiments that used a non-woven nylon web required significantly more torque to uncouple the attachment bolts. Thus, the gaskets in these embodiments was applying significant force to the bolts to inhibit their removal. This quality provides a more effective long term seal versus traditional gaskets.

While not being constrained by theory, it is believed that, in the embodiment shown, the non-woven, integral joint web skeleton when incorporated into the body is capable of compression in these ranges without reaching its yield point (or possibly its elastic limit) and thus undergoing permanent plastic deformation.

Moreover, in the preferred embodiments of the gasket, the web skeleton retains its length and width dimensions without or with little expansion laterally within the x, y plane of the skeleton while being compressed between the mating faces of the workpiece and platform under the indicated PSI ranges. That is to say, in the X and Y axis, the web skeleton is dimensionally stable, while there is typically squeeze out of the material, such as elastomer gel, comprising body 12. In one embodiment, the maximum thickness of the web skeleton TJ thickness (thickness joint) is in the range of about 15 to 40 mil, and in a most preferred embodiment, about 26 to 32 mil. The thickness of the joints and the thickness of the strands may differ and in one embodiment thickness of the joints may be greater than thickness of the strands TS. Thickness of the strands may differ and, in one direction, such as machine direction, be thicker than in the cross direction (see FIG. 3A).

Body

In a preferred embodiment, the body is an elastomer, such as an elastomer gel. A suitable elastomer gel may be a two component polyurethane or polyurea or have the properties of the polyurethane gels disclosed in the AVDEC patent publications incorporated by reference herein. Gels may have a surface tackiness, have high elongation properties, low modulus, and debone cleanly from most materials, including aluminum. Gasket 10 and gasket tape 26 may be made according to the methods set forth in the AVDEC publications provided, however, that web skeleton 14 may be positioned anywhere in the body, including on or at the top surface, on or at the bottom surface or anywhere in between. As seen with reference to the Figures, the body material is integral with the web skeleton, so as to work its way through the open pores 38 in the skeleton, and to work its way around the strands and joints so as to substantially avoid air pockets. In a preferred embodiment, the gel is a polyurethane elastomeric gel, which is mixed in two parts (polyol and isocynate) for curing after application onto the web skeleton in place in a manner which sets to substantially encapsulate the web skeleton therein. The two parts may be mixed immediately prior to contact with the flat laying skeleton, as seen in the AVDEC patents.

While the foregoing has set forth certain details of the gasket, gasket body, skeleton, shape, physical and chemical properties, the following will set forth there specific uses of the gasket or gasket tape in an aircraft environment.

Figure 1:
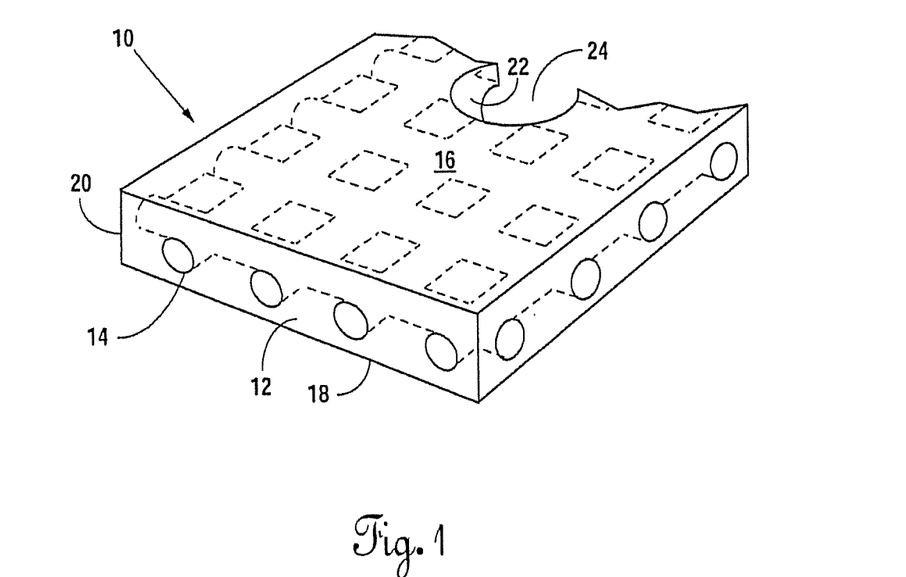
FIG. 1 is a perspective view of a part of a gasket with some features of Applicant's disclosure.
Figure 1A:
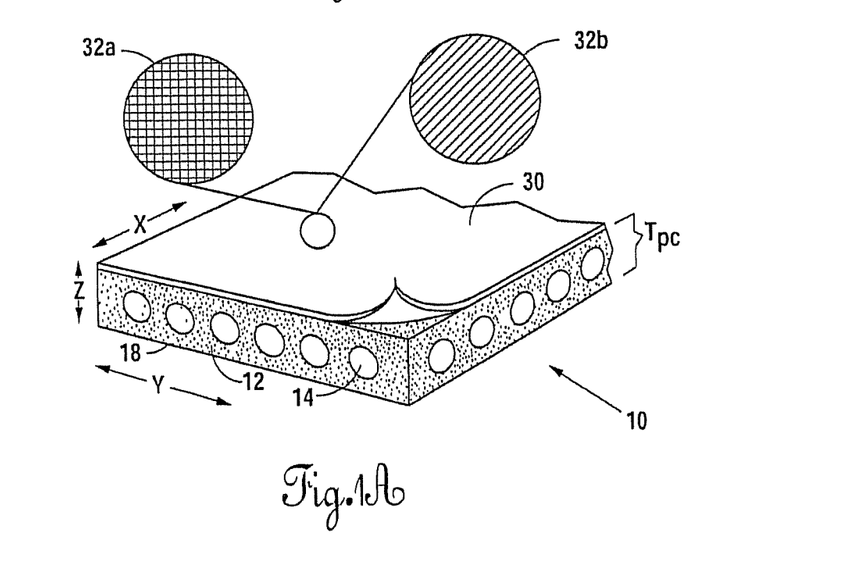
FIG. 1A is a perspective view of an embodiment of Applicant's gasket with a skin engaged thereto.
Figures 2, 3A, 3B, 3C, 3D:
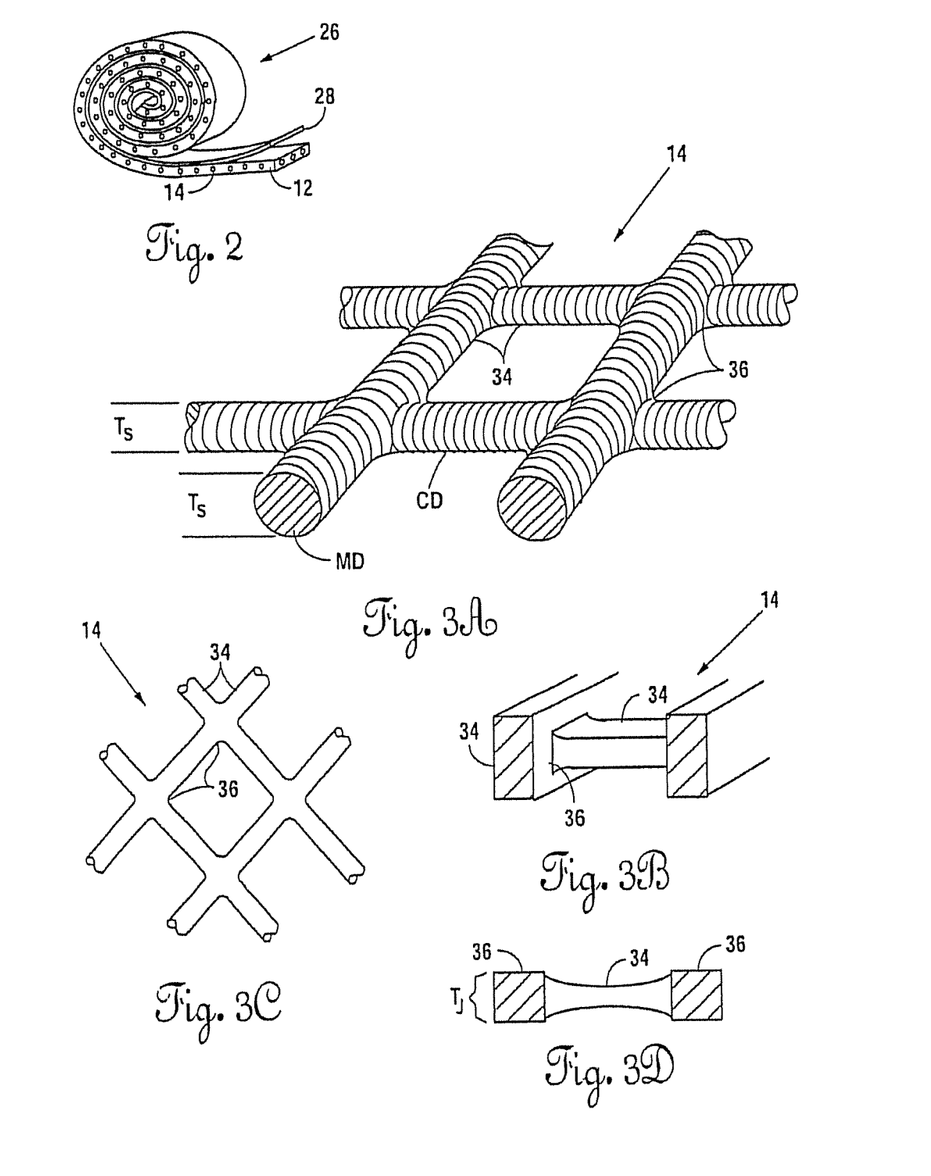
FIG. 2 is a perspective view of a gasket tape or tape with some features of Applicant's disclosure.
FIGS. 3A, 3B, 3C, and 3D are perspective views of various web configurations for use with Applicant's gasket or tape.
Figure 4A:
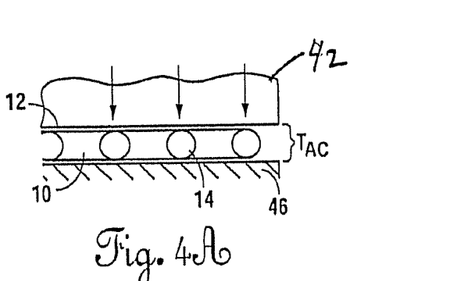
FIGS. 4A, 4B, and 4C are various views of an aircraft assembly for which Applicant's gasket may be used.
Figure 4B:
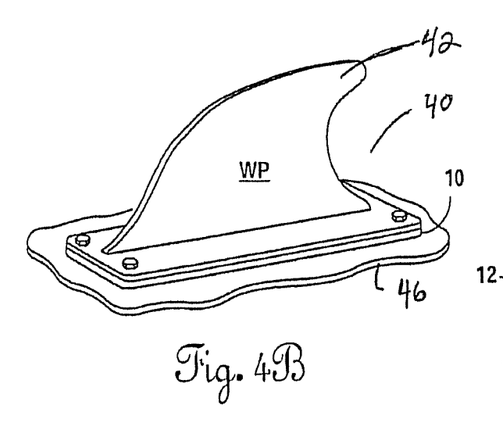
Figure 4C:
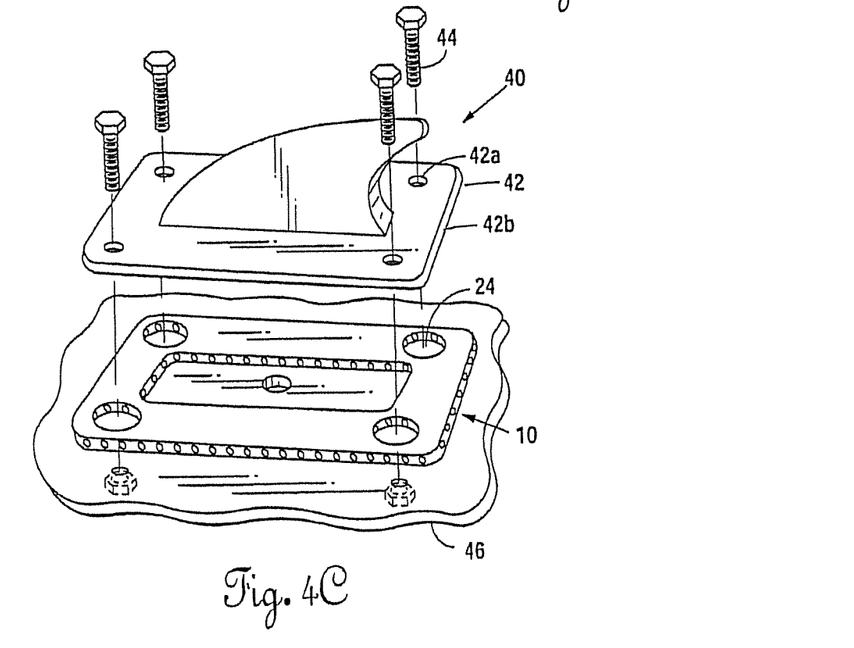
Figure 8A:
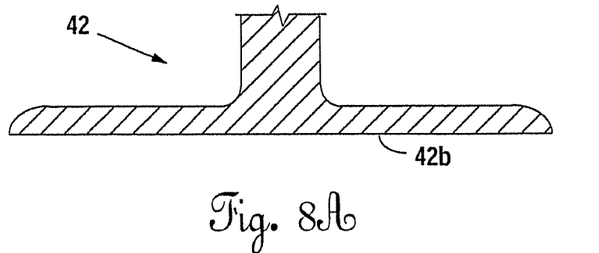
FIGS. 8A and 8B are cross-sectional views as a full contact base and a hollowed out base for an aircraft antenna.
Figure 8B:
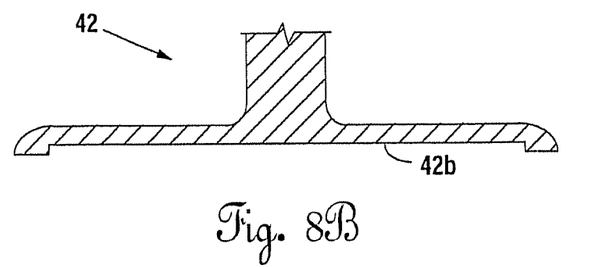

FIGS. 4A-4C illustrate an aircraft antenna assembly 40. Aircraft antenna assembly 40 may comprise an aircraft antenna 42, such as those affixed to the surface of the fuselage of an aircraft and connected to the electronics of the aircraft for transmission and receipt of electromagnetic signals to and from a remote source. The aircraft antenna 42 of the aircraft antenna assembly typically has a base 42b (full plate as seen in FIG. 8A or hollowed out as seen in FIG. 8B) with fastener holes 42a therethrough and may engage, through fasteners or the like, the fasteners 44 or the like, a fuselage 46 of an aircraft (washers may or may not be used). The base of the antenna may have a flat or slightly curved underside and the portion of the fuselage matches the flatness or curveness of the tabular base, so that the surfaces are relatively smooth and matching.

A gasket 10, according to the teachings of this application, may be interposed between the opposed faces of the antenna and the fuselage. In one embodiment, the fasteners are torqued to a range of about 10 to 70 in. lbs., in one embodiment, providing a PSI range of about 50 to 300 (preferably about 200 psi). Compression provided to gasket 10 will typically cause squeeze out and compression of body 12, until the top and bottom surfaces of web skeleton 16 make contact with (or come close to) the underside of the antenna and the top side of the fuselage. At this point, in certain embodiments, web skeleton 14 typically provides a mechanical stop to the compression in the PSI ranges set forth. In one embodiment, the thickness of gasket 10 has a pre-compression thickness Tpc of about 30 to 70 mil (preferably about 45 mil) and a thickness after compression Tac of about 30 mil or in the range of 15 to 40 mil. In some embodiments, post compression thickness of the skeleton, measured while still under compression, is at least 90% of non-compressed, in others is at least 95% of non-compressed, in others at least 97%, and still others is at least 99% of the non-compressed thickness. In one embodiment, the pre-compression thickness of the body is about 0.003 to 0.013" greater than the skeleton; in another, about 0.008" or less.

Figure 5:
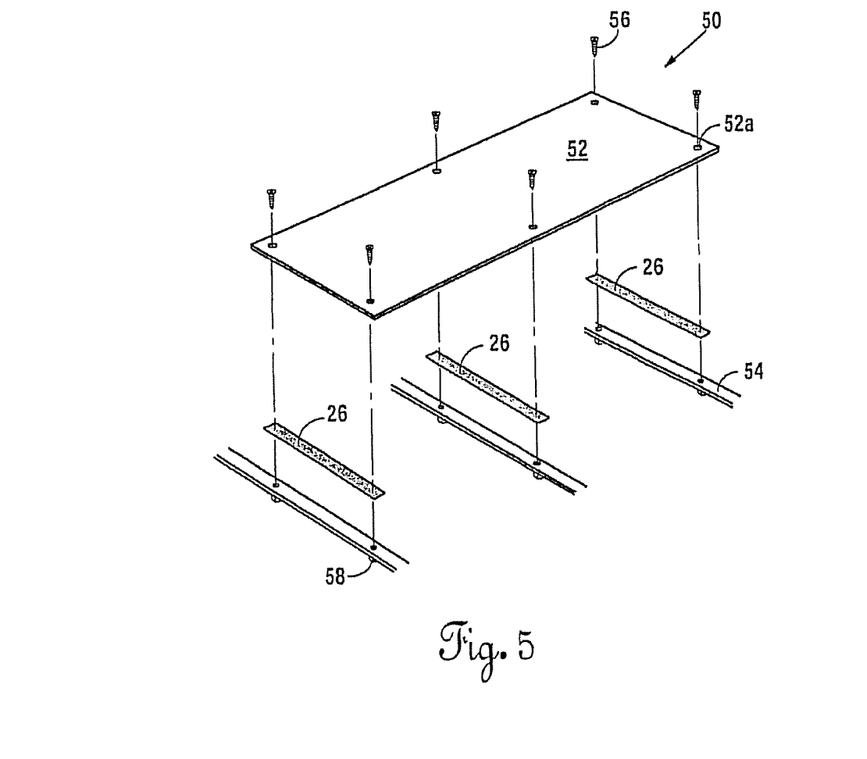
FIG. 5 is a perspective exploded view of a aircraft floor panel assembly that may use Applicant's gasket or gasket tape.

FIG. 5 illustrates a floor panel assembly 50 which, in one embodiment, may comprise a multiplicity of floor panels 52 (one shown), which may have a multiplicity of fastener holes 52a therein. Floor panels 52 are configured to removably engage a multiplicity of typically parallel or grid lined floor panel support stringers 54. Fasteners 56 and fastener receiving elements, such as nuts or blind nuts 58, are adapted to hold the floor panels against the stringers with lengths of gasket tape 26 therebetween. Gasket tape 26 may be provided in the floor panel assembly with or without a smooth, tough skin 30. Skin 30 may be, in one embodiment, a semi-porous woven fabric 32 (such as fiberglass), to allow seepage of some of the gel body therethrough. In another embodiment, skin 30 is impervious 32b and may be made of Teflon or PTFE or other suitable substance. Such an impervious skin will present a substantial barrier to the passage of moisture therethrough and add mechanical integrity to the body. Skin 30 may add about 5 mil to the gasket thickness.

One function of the skeleton is to provide shape and integrity to the body of the gasket, among other things. Here, it also in some embodiments provides a mechanical stop and compression set resistance when the floor panels are engaged with the support stringers in the PSI ranges indicated.

Fuel access doors or panels are provided, typically on the exterior of aircraft. Removal of fuel access door provides access to the fuel tank of the aircraft. Fuel access doors are typically configured to removable receipt onto the skin or fuselage of an aircraft through the use of a retainer ring and a retainer hold down ring as known in the art.

Figures 6, 7A, 7B, 7C:
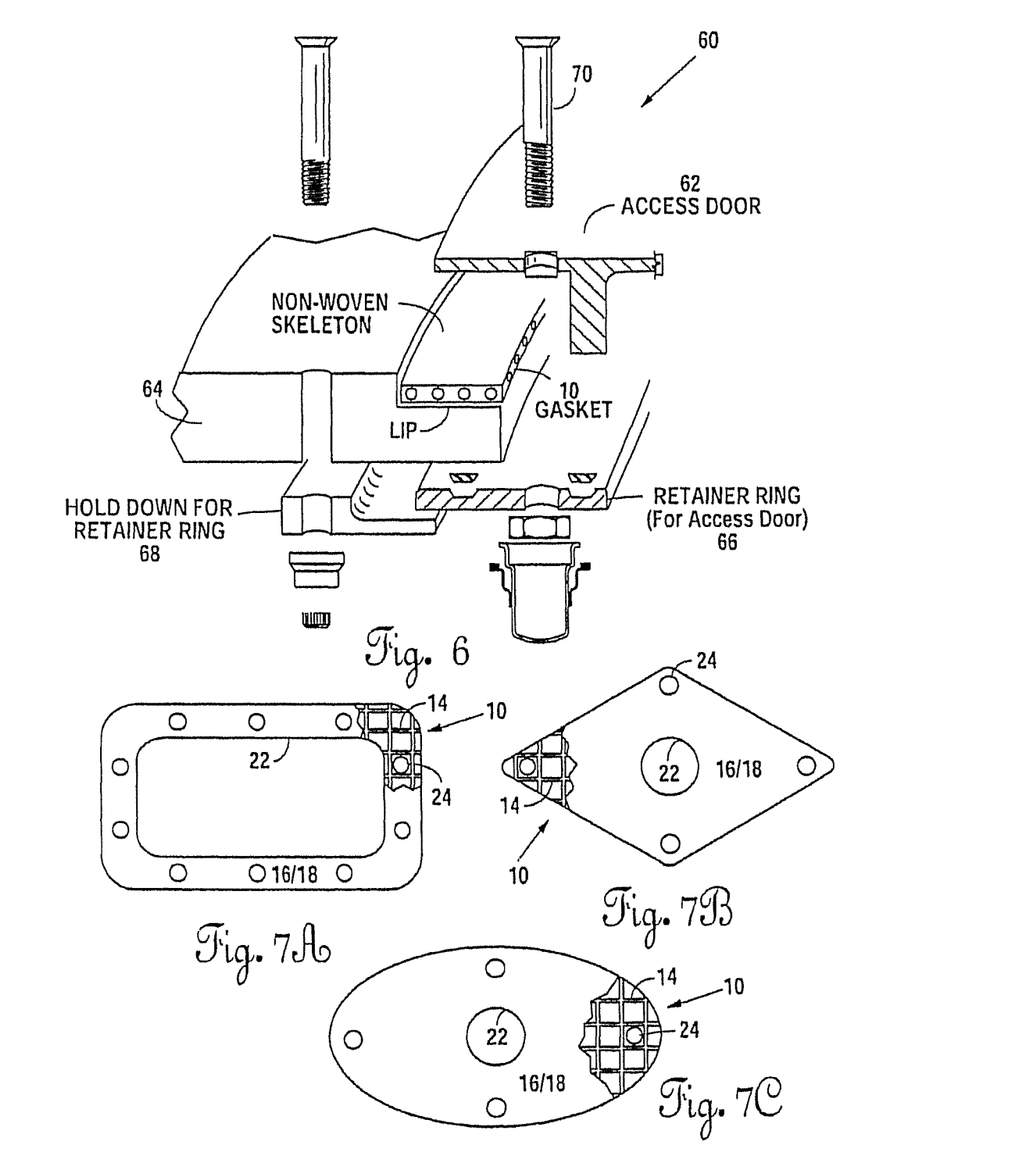
FIG. 6 is a fuel access panel assembly that may be used with Applicant's gasket or gasket tape.
FIGS. 7A, 7B, and 7C are top/bottom plan views of three different possible gasket configurations for the embodiments of Applicant's gaskets disclosed herein.

One particular application of Applicant's novel gasket 10 or gasket tape 26 is use in a fuel access door assembly 60, such as that illustrated in FIG. 6. Fuel access door assembly may include fuel access door or panel 62, that is adapted to be removably received against the fuselage or skin 64 of an aircraft exterior. Retainer ring 66 is provided with retainer hold down ring 68. A multiplicity of fasteners 70 usually are provided to hold the fuel access door 60 against a gasket, here, Applicant's novel gasket 10, which in turn lays against the upper surface or lip of the fuselage or skin 64 as seen in FIG. 6.

In the three embodiments illustrated, gasket 10 typically has a polyurethane gel body with good environmental sealing characteristics, which may flow or deform under the pressure ranges set forth herein. Mating surfaces of the workpiece and base tend to be flat or slightly curved, but with occasional minor imperfections in the smoothness of the surface. Use of Applicant's body 12 provides good adherence and environmental sealing. Web skeleton 14 may provide a substantial mechanical stop and, under the pressure ranges indicated, provides substantial incompressibility and/or compression set resistance and the possibility of reuse of the gasket. In some cases, the body maintains sufficient tackiness so that one or both compressive surfaces may be removed and web skeleton is seen to have accepted the pressures in the pressure ranges without any substantial compression set. Moreover, the dimensional stability, especially in the x-y plane, maintains its structural integrity and does not show substantial compression set deformation upon removal from between the mating surfaces after days and months of use. Compression set deformation may be less than 5% in some embodiments, less than 3% in some embodiments, and less than 1% in some embodiments. Thus, workpieces, such as antennas, floorboards, and fuel access doors, may be reattached to a tacky gasket body and re-torqued, retaining good environmental sealing and compression set resistance.

Applicant has observed the appearance, structure, integrity, and stretch of woven and unwoven gaskets, including the Conwed nylon gasket, after removal between mating surfaces following a prolonged period of compression. The Conwed nylon web under similar circumstances with the same polyurethane gel body was without visible loss of structural integrity or any observable dimensional stretch in the x,y plane. It was likely less than about 5% and less than about 3% stretch in the x,y plane or in compression (thickness), and in one embodiment, compression of less than 1% (in thickness) following compression in the range of about 50 psi to 500 psi. It was simply not observable to the naked eye that there was any change in the x,y dimensions nor thickness of the gasket when upon compression the torque or psi ranges were achieved.

Substantial incompressibility means, within the psi range limits of about 50 to about 500 psi, that after the psi has been applied to the gasket, a thickness measurement of the web (still under compression) finds that, in one case, there is less than about 5% reduction in thickness and, in a second case, less than about 3% and, in a third case, less than about 1% thickness reduction. In another embodiment, Applicant's gasket may undergo compression, before or up to its elastic limit, and in another case, between its elastic limit and its yield limit.

Nylon and suitable web or net equivalents, including Kevlar, have mechanical, chemical, and physical properties that Applicant has discovered suitable for specific uses, including for a sticky gasket or tape on an aircraft. These properties include: absorbs very little moisture, which allows the material to retain a high degree of dimensional stability; retains excellent impact and non-impact strengths even at temperatures below freezing; excellent resistance to chemicals, including hydraulic fluids, oils, grease, saltwater; exceptionally strong resistance to cracking under stress; excellent abrasion resistance; low coefficient of friction; dampens noise and vibration; fatigue resistance and, when formed as a web, flexible, but substantially non-compressible. In particular implementations, the material may have a hardness range of great then 100 Rockwell.

Among the netting or web configurations that Applicant's webbing may take are square net; flat net (extruded and oriented square netting configuration with flat joints in uniform thickness); diamond net (extruded netting with diamond shaped pore configuration); or multi-layer co-extrusion where different polymers conform different layers on the same net configuration. In one embodiment, Applicant's web is comprised of a long chain thermoplastic polymer and, in another embodiment, the polymer is a long chain polyamide, in one example, nylon.

Figure 9:
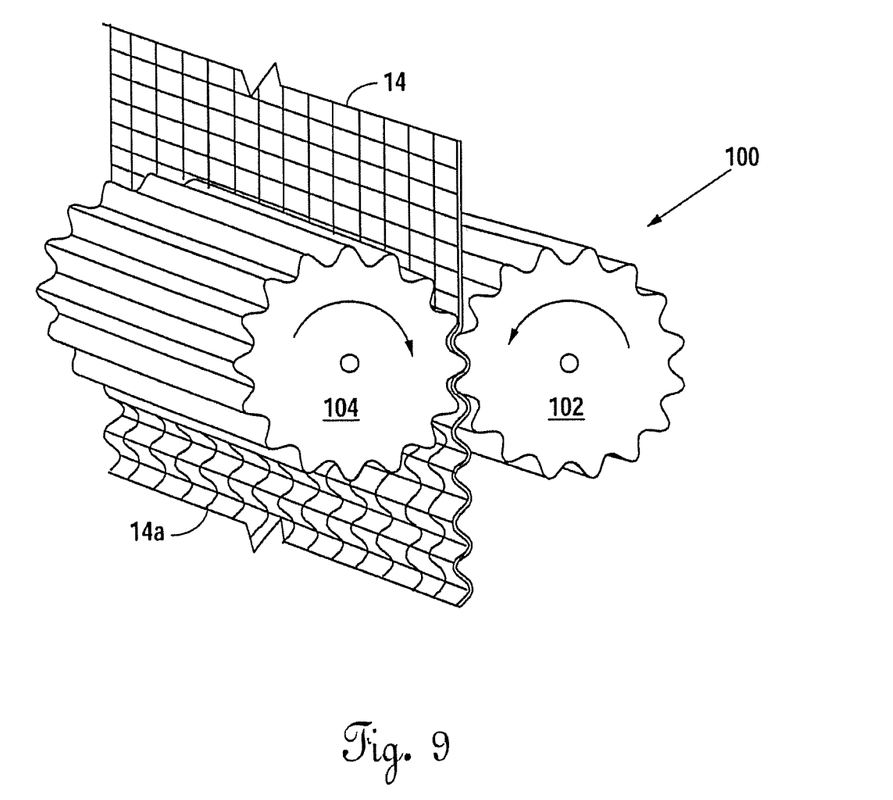
FIG. 9 is a perspective view of the web skeleton being crimped.

Plastic netting, including nylon webbing, may be made through a continuous extrusion process. The extrusion process is a melt processing of thermoplastics into netting. An extruder melts and pressurizes plastic pellets and forces them through tooling in a die to create a netting profile. Following the die to create a netting profile, may follow a step of crimping using pressure and/or using crimping apparatus 100 as set forth in FIG. 9. Web skeleton 14 may be subject to pressure (with or without heat) between shaping rollers 102/104 to create a crimped skeleton 14a.

Figure 10:
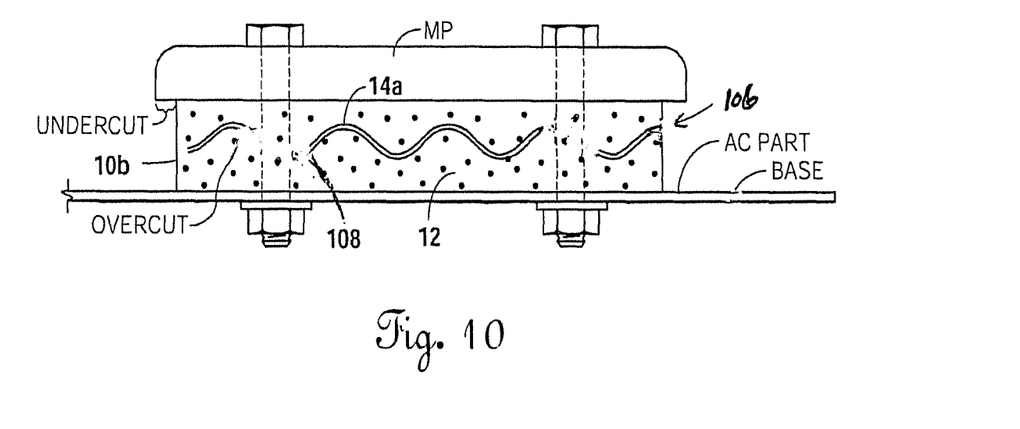
FIG. 10 is an elevational view of a moveable aircraft part Mp fastened to a base, the base being another aircraft part Ac with a gasket under compression therebetween, the gasket comprising a crimped skeleton and a body.
Figure 11:
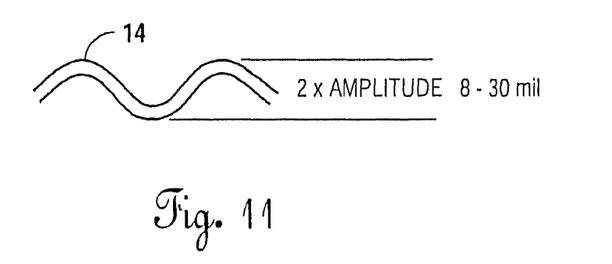
FIG. 11 is an elevational view showing the double amplitude of the crimped web skeleton.

The crimping of thermoplastic material, including web material 14 with the crimping apparatus described herein, may result in a crimped, electrically non-conductive webbing for use in any of the articles set forth in these specifications and any other suitable article. A "crimped" gasket 106 is set forth in FIG. 10. The crimped webbing may also be made in an orientation process where, after the extrusion process, the webbing is reheated and run through the crimping tool as set forth in FIG. 9 above in any orientation with respect to MD and CD. Applicant's FIG. 10 shows 'over cut' fastener holes 108 (cut about ½-1 diameter greater than the fastener diameter) to allow for some flattening of the crimp under compression. Applicant's FIG. 10 also shows that crimping may use an undercut gasket in compression between a moveable piece Mp and a base. FIG. 11 shows that the double amplitude of the resulting from crimping may be about 8-12 mil in one case and 50-200% of the web thickness in another.

Skin 30 (see FIGS. 1A and 14B) may be used on one or both sides of body 12 (or not at all). Skin 30 may be substantially impervious to moisture in one embodiment, semi-porous in another embodiment. One semi-porous skin is a metalized woven fabric sold under the mark Zell-CR available from Shieldex Trading, Palmyra, N.Y. Another is Ripstop nylon (non-conductive), such as 1.1 oz. or 1.6 oz. Ripstop nylon. In one embodiment, a skin is used on one side, leaving the other side sticky and is used on stringers of an aircraft with the sticky side down, on and against the stringers and the non-sticky side receiving floorboards, with fasteners providing compression therebetween, see FIG. 5. Other uses of the single sided sticky gasket/tape include any assembly of two pieces under compression where the pieces are frequently disassembled. The sticky side is typically used against a base and the skin against the removable piece.

Figure 12:
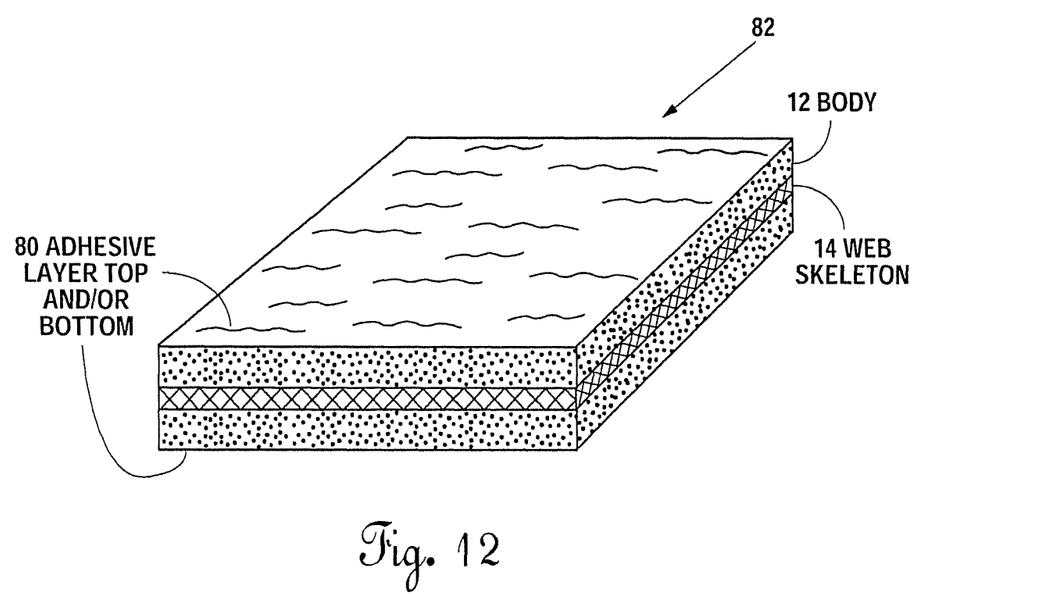
FIG. 12 is perspective view of an embodiment of Applicant's composite comprising gasket or tape having a harder gel and an adhesive outer layer(s).

FIG. 12 shows a composite product 82 of applicant's gasket/tape that includes, in one form, a gel having a hardness greater than those normally used in some applications disclosed herein. In a normal range, gel is in the hardness range of about 75 to 150 (measured with a 37.5 g half cone penetration). The harder gel (about 30 to 90 on 37.5 gr half cone penetration) may somewhat reduce flowability under compression. A surface tackiness, in one embodiment, of any hardness gel, may have on the top and/or bottom surface of body 12 a sticky (to the workpiece) pressure sensitive adhesive coating 80.

Figure 13:
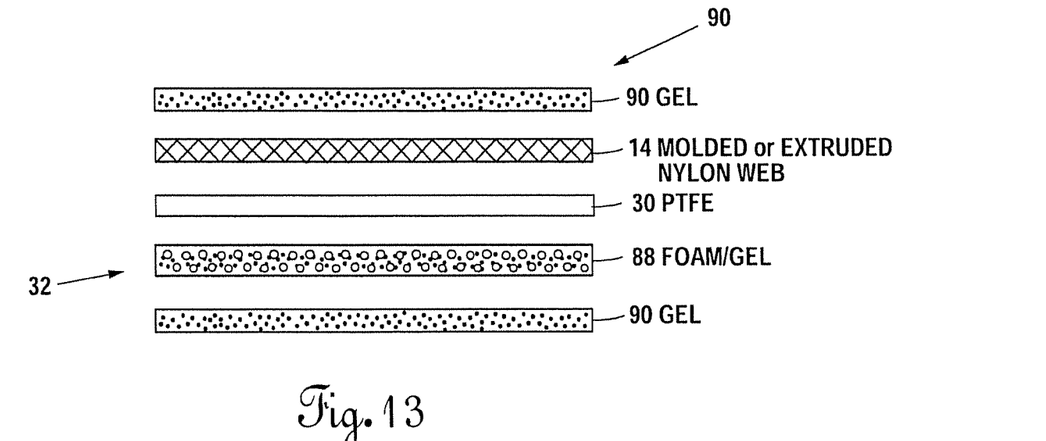
FIGS. 13 and 13A are elevational views—FIG. 13 exploded, FIG. 13A compressed, for using foam with Applicant's composite.

FIGS. 13, 13A, 14, 14A, and 14B illustrate various alternate preferred embodiments of Applicant's composites. All of these embodiments except FIG. 15 combine a gel containing foam layer 88 along with, at least, skeleton 14. An optional thin (about 3-5 mil.) gel only layer 90 may be provided on the surface of foam/gel layer 88 (or integrated with web 14, FIG. 15). FIG. 13 exploded and 13A under compression illustrate the use of skeleton 14, more specifically, a molded or extruded nylon web or any of the other skeletons disclosed herein and in U.S. patent Ser. No. 14/484,570, filed Sep. 12, 2014, incorporated herein by reference.

FIG. 13 shows gel layers separate from the foam for illustration, but it is to be understood that unless the foam is a closed cell foam, an open, semi-open or reticulated foam is at least partly saturated prior to use by the methods set forth in the patents incorporated herein by reference. When open cell foam is used, the gel may be layered separately, alternating with a closed cell foam.

Figure 13A:
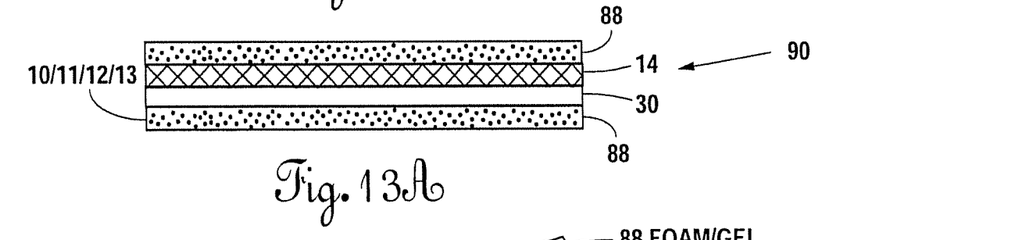

In FIGS. 13 and 13A, a tacky web and foam composite gasket/tape 90 is illustrated. Skeletal web 14 typically, when the product is manufactured and in use, carries a thin layer of gel on the outer surfaces thereof, as well as gel therethrough in the voids of the skeleton 14. If a PTFE or skin-type sheet 30 is used (as shown here as an interior layer rather than a surface layer), then tackiness to the lower or bottom surface of the gasket may be provided by gel/foam layer 88, which may comprise any type foam (open, semi-open, reticulated or even closed cell), which may be partially or fully saturated with gel or other suitable tacky matrix. Typically, a thin, sticky outer layer 90 of gel is present on the finished foam composite gasket/tape 90.

Figure 14:
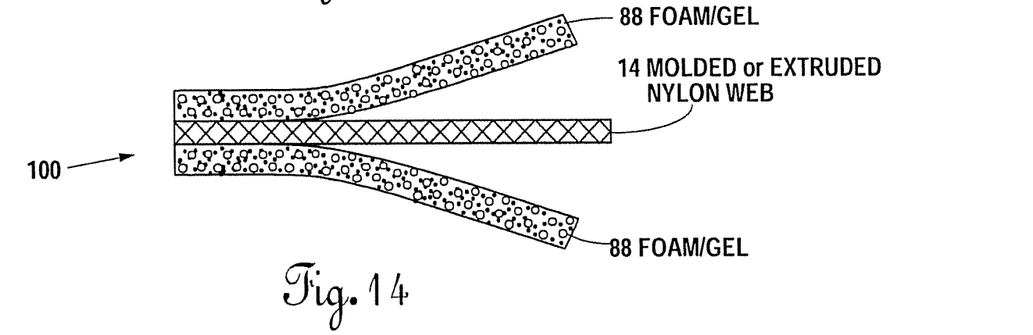
FIGS. 14 and 14A are elevational views—FIG. 14 exploded, FIG. 14A compressed, for using foam with another composite.
Figure 14A:
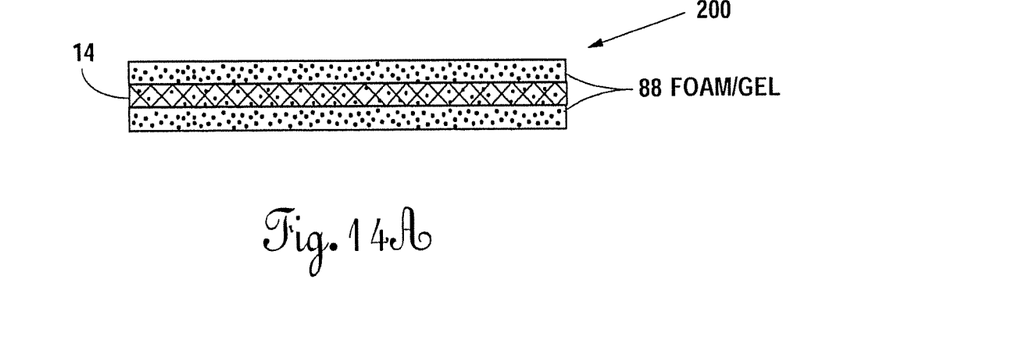
Figure 14B:
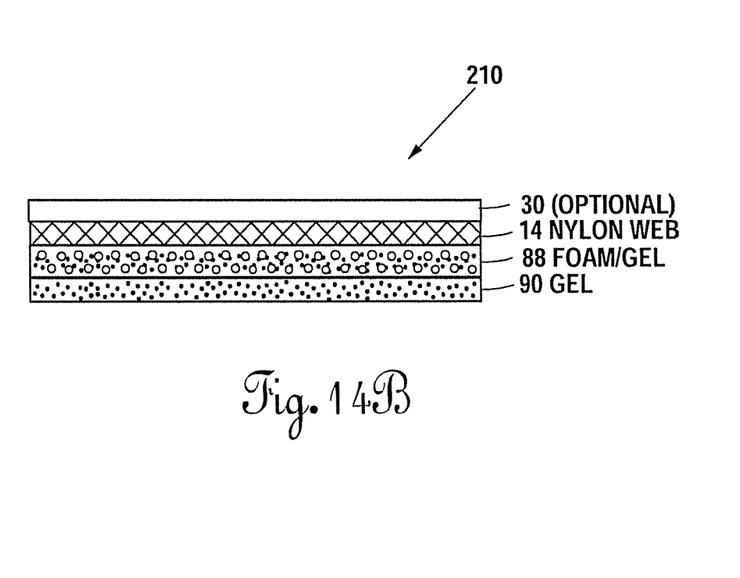
FIG. 14B is a side view of an embodiment of Applicant's gasket or tape using an at least partially saturated foam layer adjacent a saturated web layer with, optionally, a skin on the outer surface of the web.

FIGS. 14, 14A and 14B illustrate composites 200/210 with a foam gel layer 88, which may be manufactured according to the AVDEC patents incorporated herein by reference. Also, nylon web or skeleton 14 is placed adjacent a surface of the saturated foam/gel layer 88 before the material is compressed between two parts. The nylon web may be partially or fully saturated before placement adjacent foam/gel layer 88, before placement between the aircraft parts or the nylon web may be dry and compression when the aircraft parts are torqued down will force the gel from the foam gel to migrate into the open spaces of the nylon web and adjacent the face of the workpiece adjacent the nylon web, effectively coating it to provide environmental seal.

Applicant's foam composite 210 (FIG. 14B) may be used between floorboards FB of an aircraft and support stringers S or members (see FIG. 5). In this particular embodiment 210 (FIG. 5), a "skinned" version may be used with the tacky side optionally having a thin tacky gel layer 90 against the aircraft structure and the impermeable or partially porous skin 30 against the surface of the floorboard for ease of positioning the floorboard and ease of removability. Web 14 helps with structural integrity and the foam helps maintain resiliency.

Gel tends to migrate when the compositions are placed between workpieces which are then placed under compression, for example, by fasteners. The gel will tend to migrate to voids in any type of a skeletal member, openings in the open cells of the foam, including closed cell foam where the cell walls have been broken by virtue of compression, and typically vertical migration is at least partly stopped by impervious skin/barrier, such as PTFE skin 30. The composites, excepting the skin, are typically encapsulated with gel, the gel providing a good environmental seal, the foam providing some resiliency and some (though usually not total) resistance to migration as well as some structural stability and the web skeleton, if present, providing additional stability. While the gel may be a tacky polyurethane gel, any suitable gel, including fluorosilicon gels may be used. In alternate embodiments, suitable non-gel elastomers may be used, such as silicon, butadiene, isoprene, or polyolefin.

FIGS. 14 and 14A illustrate alternate preferred composite 200, which comprises Applicant's novel molded or extruded nylon or plastic web 14 as seen in the '570 application, with a foam/gel layer 88 on the top and/or the bottom thereof (shown here with foam/gel layer 88 on both top and bottom). Foam may be opened, closed, reticulated or semi-opened, and may be partly or fully saturated with the gel to provide tackiness on either side or both sides of the composite 200.

As stated above, the foam may be any flexible, compressible foam of an open, closed reticulated or semi-open cell foam (see, for example, U.S. Pat. No. 8,561,310, incorporated herein by reference for a semi-open cell nylon foam). Any of the composites disclosed may have a PTFE skin on the upper, lower or both surfaces or in between. Using a skin on an upper or lower surface, of which PTFE is one example thereof, will present a substantially non-tacky surface to the workpiece. In some applications, it may be preferable for the composite to have a tacky side, with a tacky gel on the surface of a foam or on the surface of a skeleton, such as seen in FIG. 5, for exposure to and contact with the workpiece under compression to provide a good environmental seal.

Applicants's gel may be a polyurea gel, polyurethane gel or other suitable two-part polymer gel. It may have a peel strength of about 0.3 and 1.0 lb./in. width, or about 0.1 and 2.0 lb./in. width. Gel soaked open cell foam with a PTFE liner (such as in AVDEC HT-3000) and another with a 2 mil polyfilm (AVDEC AD-89513) yielded a range of about 65-85 Shore "00" or about 35 to 65 Shore "A". This range is one that is appropriate for Applicant's composites, also a broader range about 50-100 on Shore "00", about 25-75 on Shore "A". The gel can be two-part mix chemically cured as seen, for example, in U.S. Pat. No. 7,229,516, incorporated herein by reference, or may be thermally or otherwise cured. The gel is typically impregnated into the foam in those composites which call for a partial/complete saturation of foam, when the gel is uncured and the gel is then allowed to cure in place in the foam, before use.

In some embodiments, the gel may be infused with a carry and suspension conductive particles (metallic or semi-conductive particles) for providing some conductivity between workpieces, such as metal parts, providing compression to Applicant's composites. In one embodiment, these particles may be graphene mixed in the gel or the resin and graphene mix as disclosed in U.S. Pat. No. 8,652,362, incorporated herein by reference. In another embodiment, the metal pigments disclosed in US Publication No. 2013/0168612, incorporated herein by reference may be used mixed uniformly with the gel. The metal particles disclosed in the Parker-Hannifin U.S. Pat. No. 8,633,402, incorporated herein by reference, or any other suitable conductive or semi-conductive particle may be used to provide some conductivity, such as where EMI is a problem. The particles may be spherical and about 7 microns in diameter, such as aluminum spheres. The particles may be flake or platelet shaped, thickness about 1 micron and in one case may be Nickel. HCA-1 is one such Nickel platelet available from Novanet.

Ease of removability of a composite from a workpiece may be achieved by using a skeleton of a harder nature, for example, Applicant's molded or extruded nylon skeleton instead of woven fiberglass or a non-woven skeleton is more resistant to compression. Ease of removability may also be achieved by using a thicker skeleton, for example, a skeleton in the range of about 18 to 28 mil, rather than, for example, in the range of about 8 to 17 mil. If foam is used, the foam under compression may tend to impeded somewhat the lateral movement of gel with less edge squeeze out than cured gel.

Figure 15:
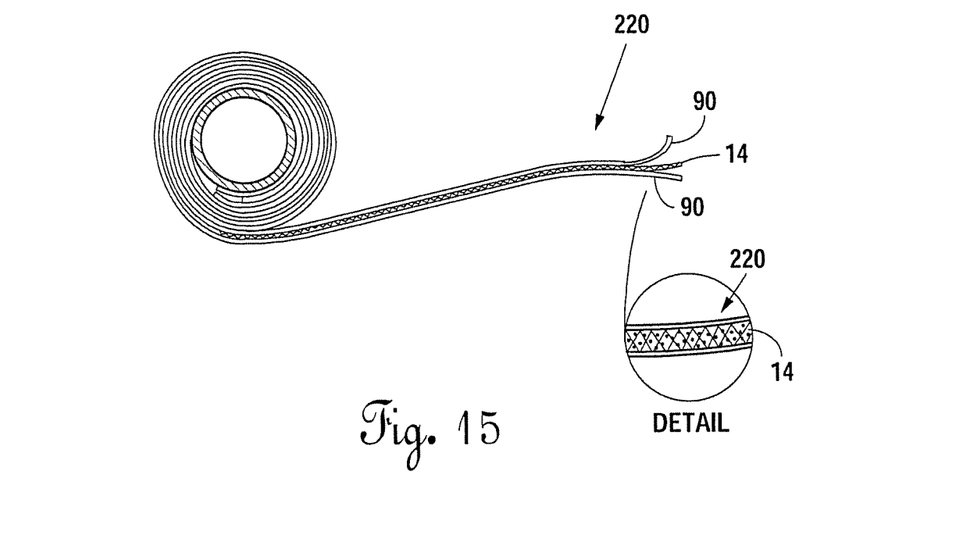
FIG. 15 illustrates an embodiment of gaskets tape comprising essentially a web soaked with gel with, optionally, skin on one or both sides.

FIG. 15 illustrates another composite, a tape composite 220 using applicant's novel skeleton web 14, the composite in a tape form, which tape is basically the web saturated with gel. It may have a PTFE skin on one side or the other, or none at all. In one embodiment, the gel in the hardness range of about 75-150 is used, and in another embodiment, the harder gel set forth herein is used.

Although the invention has been described with reference to a specific embodiment, this description is not meant to be construed in a limiting sense. On the contrary, various modifications of the disclosed embodiments will become apparent to those skilled in the art upon reference to the description of the invention. It is therefore contemplated that the appended claims will cover such modifications, alternatives, and equivalents that fall within the true spirit and scope of the invention.

The invention claimed is:

1. An assembly for use with an aircraft, the assembly comprising: an aircraft base;
a workpiece for removably engaging the base;
a multiplicity of fasteners engaging the aircraft base and workpiece and capable of receiving a torque and applying compression to the base and workpiece;
a gasket or gasket tape positioned between the aircraft workpiece and the aircraft base, the gasket or gasket tape comprising:
a pliable, elastomeric body having a tacky, non-adhesive upper surface, a tacky, non-adhesive lower surface, and a perimeter; and
a non-metallic, non-fibrous, non-conductive, non-woven skeletal web made from a plastic capable of being molded, extruded or melt processed, and having an upper surface, a lower surface, a perimeter and a multiplicity of non-overlapping strands meeting at and integral with a multiplicity of joints, the strands and joints defining a multiplicity of open pores;
wherein the elastomeric body, in a pre-compressed condition, is the same thickness or thicker than and substantially encapsulates the skeletal web, including filling the pores thereof;
wherein the x and y dimensions of the gasket or gasket tape are greater than the z (thickness) dimension; and
wherein the gasket or gasket tape is configured for some lateral flow of the elastomeric body under compression between the workpiece and base, such compression in the range of about 50-500 psi, wherein under such compression the gasket or gasket tape is capable of holding about 50% or more of an initial torque value after 24 hours.

2. The assembly of claim 1, wherein the skeletal web is crimped.

3. The assembly of claim 1, further including at least one foam layer configured for laying adjacent at least one of the upper surface or lower surface elastomeric body.

4. The assembly of claim 3, wherein the foam layer partly comprises a material of the same composition as the material comprising the elastomeric body.

5. The assembly of claim 1, wherein the assembly is configured such that the upper surface of the elastomeric body of the gasket or gasket tape contacts one of the aircraft base or workpiece and the lower surface of the elastomeric body of the gasket or gasket tape contacts the other of the aircraft base or workpiece.

6. The assembly of claim 5, wherein the gasket or gasket tape is capable of remaining tacky through multiple compression and release cycles.

7. The assembly of claim 5, wherein the gasket or gasket tape is capable of remaining tacky through multiple temperature and pressure cycles.

8. The assembly of claim 1, wherein the elastomeric body of the gasket or gasket tape is comprised of a cured polymer gel.

9. The assembly of claim 8, wherein the cured polymer gel is polyurethane.

10. The assembly of claim 1, wherein the elastomeric body is silicon free.

11. The assembly of claim 1, further including a skin for engaging at least one of the upper or lower surfaces of the elastomeric body of the gasket orgasket tape.

12. The assembly of claim 1, wherein the body is a polyurethane gel and has a hardness between about 40-150 on 37.5 gr. half cone penetrometer.

13. The assembly of claim 1, wherein the skeletal web is comprised of nylon.

14. The assembly of claim 1, wherein the joints of the skeletal web of the gasket or gasket tape are thicker than any of the strands.

15. The assembly of claim 1, further including a fillet seal on the aircraft base and at a perimeter of the aircraft workpiece and adjacent the gasket or gasket tape.

16. The assembly of claim 1, wherein the skeletal web has a tensile strength of between about 10 Mpa and 150 Mpa.

17. The assembly of claim 1, wherein the assembly is configured such that the upper surface of the elastomeric body of the gasket or gasket tape contacts one of the aircraft base or workpiece and the lower surface of the elastomeric body of the gasket or gasket tape contacts the other of the aircraft base or workpiece; wherein the gasket or gasket tape is capable of remaining tacky through multiple compression and release cycles; and wherein the elastomeric body is silicon free.

18. The assembly of claim 1, wherein the workpiece is an aircraft antenna.

19. The assembly of claim 18, wherein the aircraft base is part of an exterior surface of the aircraft.

20. The assembly of claim 19, wherein the assembly is configured such that the upper surface of the elastomeric body of the gasket or gasket tape contacts one of the aircraft base or workpiece and the lower surface of the elastomeric body of the gasket or gasket tape contacts the other of the aircraft base or workpiece; and wherein the gasket or gasket tape is capable of remaining tacky through multiple compression and release cycles.

* * * * *